United States Patent Office 3,174,823
Patented Mar. 23, 1965

3,174,823
PROCESS FOR PRODUCING CRYSTALS OF Zn, Cd and Pb SULFIDES, SELENIDES AND TELLURIDES
Bernard Kopelman, Messenger Lane, Sands Point, N.Y.
No Drawing. Filed Dec. 15, 1961, Ser. No. 159,773
13 Claims. (Cl. 23—50)

This invention relates to a crystallization process. More particularly this invention relates to a method of crystal formation from amorphous and non-crystalline materials.

In particular this invention relates to means for forming crystals from non-crystalline forms of metal-Group VI compounds, wherein the metal exhibits a plus 2 valency and the Group VI portion of the compound is sulfur, selenium and/or tellurium.

A wealth of products has been built around the semiconducting properties of several families of elements and compounds. In the case of elements, these comprise Group IV of the Periodic Table, namely carbon, silicon and germanium with 4 valence bonds. Other systems involve combinations of elements more electropositive than Group IV with those more electronegative such that the compounds formed average four. Thus, compounds of Group III which Group V, averaging IV, are semiconductors. Examples of these comprise such well known materials as InSb, InP, GaAs, GaP, etc. Additional semiconductors can be prepared by combining elements of Group II with those of Group VI, also averaging IV. Here we have such well known compounds as ZnS, used for television and electroluminescent phosphors; CdS, used for solar cells, photodetectors and television pick-up devices; PbS, used for television and photodetection; PbTe, useful for thermoelectric generators; ZnSe, useful for electroluminescent phosphors. It is with this group of compounds comprising elements of plus 2 valence with elements of minus 2 valence that this invention particularly pertains.

Semiconductors require well-defined crystalline lattices to be operative and the success in growing large single crystals of germanium and silicon is well known. This same process, the Czochralski method, has also been notably successful in growing large single crystals of some of the Groups III–V compounds and gallium arsenide is a particularly notable example.

Very little success has been achieved in producing crystals of the Groups II–VI compounds, primarily because of the high melting points of these compounds and their tendency to become contaminated and to decompose at these high temperatures. For example, ZnS melts over 1850° C., CdS over 1750° C. ZnS does not dissolve in either fused or solid sodium sulfide $Na_2S$. (Ref.: Metalborse, vol. 17, pp. 2637–8, and H. Fincke, Chem. Zentra I, p. 481, 1928). ZnS does not dissolve either in molten sulfur, as can be readily determined by adding ZnS to molten sulfur, stirring and quenching; by X-ray diffraction, only the lines of ZnS and of S can be seen. Some laborious laboratory techniques have produced some reasonably sized crystals by vapor reaction of the elements, but the high temperatures, and the difficulty of control of the stoichiometry has prevented these being utilized on a commercial scale. No method has ever been described for growing these crystals out of solution, a technique of obvious commercial importance. It is one of the objects of this invention to describe a method that allows growth of crystals of highly pure Group II–VI compounds at reasonably low temperatures under simple conditions.

It is an object of this invention to provide means for forming crystals from non-crystalline forms of metal-Group VI compounds wherein the metal exhibits a plus two valency and the Group VI portion of the compound is sulfur, selenium and/or tellurium. It is a further object of this invention to form crystals of the metal-Group VI compounds wherein the crystals are of a controllable average size. An additional object of this invention is to form the metal-Group VI compounds in a cheap and reproducible fashion.

These, and other objects are secured by dissolving at least one said non-crystalline form of a metal-Group VI compound in a molten solvent consisting of alkali metal polysulfide, alkali metal polyselenide and/or alkali metal polytelluride and heating the resultant solution to drive off sulfur, selenium and/or tellurium. As a result the alkali metal sulfide, the alkali metal selenide and/or the alkali metal telluride is formed. The metal-Group VI compound is only slightly soluble in the alkali metal sulfide, selenide or telluride and as a result the metal-Group VI compound comes out of solution as sulfur, selenium or tellurium are driven off as the heating continues. The metal-Group VI compound deposits as crystals. Heating can be continued to a desired evolvement of sulfur, selenium or tellurium. The size of the crystals of the metal-Group VI material can be controlled by the extent to which total or partial formation of alkali metal sulfide, selenide, and/or telluride is carried out.

There are a whole family of sodium and potassium sulfides, though $Na_2S$ and $K_2S$ are the only ones commercially available. The systems Na-S and K-S have been described, along with the melting points of the several compounds. (Reference: The Polysulfides of the Alkali Metals, by J. S. Thomas and A. Rule, Chemical Society Journal, London, 1917, pp. 1063–1085.)

The melting points, in degrees centigrade, for the various sodium sulfides are: $Na_2S$ 920; $Na_2S_2$ 432; $Na_2S_3$ 223.5; $Na_2S_4$ 275; and $Na_2S_5$ 251.7. All of the sulfides having a higher sulfur content than $Na_2S$ are thermally unstable above their melting points and drive off elemental sulfur until they reach the stable form $Na_2S$. Similar considerations hold true for the alkali metal selenides and the alkali metal tellurides with respect to the alkali metal polyselenides and the alkali metal polytellurides.

As an example of my discovery is the fact that ZnS is soluble in molten sodium polysulfides, and, upon prolonged heating of the melt, the excess sulfur is driven off, which decreases the solubility of the ZnS in the molten salt until the polysulfides have been converted to $Na_2S$, and as this occurs ZnS crystallizes out. Thus, there is provided a process for producing crystals of ZnS, comprising dissolving ZnS in molten sodium polysulfide, heating to drive off the excess sulfur, and causing the ZnS to crystallize out as well defined crystals. If the sulfur is driven off very slowly, such as by maintaining the melt in the range of 500–600° C., the crystals produced are very large, several hundred microns into the millimeter size. However, a great many hours are needed this way. Commercial ZnS phosphors, useful for television picture tubes and electroluminescence, are found to have a particle size of 20–30 microns, and larger crystals are not required for commercial devices.

It is possible by this invention to grow very large single crystals, using the technique of putting, for example, all the ZnS in solution in the molten $Na_2S_5$ and suspending a seed crystal. Larger crystals will result if the crucible containing the melt is closed, kept entirely at a uniform temperature, and the sulfur vapor allowed to escape slowly, for example, through a small orifice with a resulting build-up of sulfur pressure. In this way one obtains a higher mobility of the atoms from solution onto the seed crystals by use of a higher temperature, yet allowing only a slow rate of decrease of solubility of ZnS in the melt by maintaining a higher sulfur vapor pressure.

Electroluminescent ZnS gives a green or blue color upon excitation with an A.C. field. Electroluminescent ZnSe gives a red. To obtain orange or yellow, a crystal is prepared by mixing ZnS and ZnSe and firing at high temperature until a mixed crystal Zn (S, Se) is obtained, in which the Se and S are each part of the crystal lattice. This can also be obtained under the concept of this patent by dissolving ZnS in a molten solvent of $Na_2(S_x,Se_x)$ or in $Na_2Se_x$ alone. The relative amount of S and Se which will be found in the final crystal will be a function of (a) the phase diagram $Na_2S$—$Na_2Se$—$ZnS$—$ZnSe$ and (b) the relative free energies of formation of ZnS and ZnSe compared to $Na_2S$ and $Na_2Se$. Thus, $Na_2S$ is known to be thermodynamically more stable (greater negative free energy of formation) than $Na_2Se$. It is expected that ZnS is more stable than ZnSe. The exact values will determine how much of the sulfur will be bound to the Na and how much to the Zn. Thus, mixed crystals can be obtained. Thus, if $Na_2S$ compared to $Na_2Se$ is much more stable than ZnS compared to ZnSe, then a mixture of $Na_2Se_x$ and ZnS, or of $Na_2S_x$ and ZnSe, will yield $Na_2S$ and ZnSe upon heating. If however, ZnS compared to ZnSe is much more stable than $Na_2S$ compared to $Na_2Se$, then, upon heating, in the case of either of the mixtures cited above, ZnS and $Na_2Se$ will result. Thus, depending on the relative stabilities of the starting material chosen, either mixed crystals or pure sulfide, selenide or telluride crystals may be grown out of the melt in accordance with the process of this invention.

The solubility of ZnS decreases as the amount of sulfur in the melt in excess of the stoichiometric $Na_2S$ decreases. Thus, the metal-Group VI compound, e.g., ZnS crystallizes out as the excess sulfur is removed, and, it is not at all necessary to remove the excess sulfur, selenium and/or tellurium completely from the polysulfide, polyselenide, polytelluride, for example, from the sodium polysulfide ($Na_2S_x$) melt in order to achieve crystal growth. Indeed, it may be advantageous not to remove all the excess sulfur, selenium or tellurium, particularly if the crystals are being doped with other additives in the solution.

Semiconductors, to develop useful properties, must be doped. This is the addition of small amounts of other elements, which, in the simplest sense, set up electric dipoles in the lattice and thus disturb the electron uniformity of the atomic lattice. These "doping" additions may be the addition of Groups I–VII (that is plus one with minus one valance) such as $Cu^+$ and $Cl^-$; or Groups I–III such as $Cu^+$ and $Al^{+++}$ to replace $2Zn^{++}$ since the overall lattice must remain electrically neutral. These "doping" additions can be made at various times during the process. Thus, in particular regard to ZnS the "doping" additions are added before, during or after the addition of the ZnS to the molten polysulfide to create these disturbed lattice sites at will in the ZnS crystal. This is also a unique feature of the invention since the dope crystallizes along with the ZnS into the ZnS lattice. Under present commercial practise, it must be diffused into the crystal at high temperatures from a simple physical mixture of the phosphor and doping addition, resulting possibly in non-uniformity.

Examples of the practise of the invention follow:

*Example 1*

Sodium pentasulfide is prepared, though the lower polysulfides may be used. It is preferred because it dissolves more ZnS than the lower polysulfides. Alumina crucibles are preferably used for containing the melt, though glazed porcelain is reported to be inert to the melt. Alumina shows no attack whatsoever. Quartz, vitreosil and platinum are attacked slightly at elevated temperatures, and, though graphite is inert, some of the graphite powders off and contaminates the melt. To the alumina crucible is added 240 gms. of $Na_2S \cdot 9H_2O$ (corresponding to 78 gms. $Na_2S$). It is heated to 90° C., and the $Na_2S$ dissolves in its own water of crystallization. Then 128 gms. of sulfur are added slowly and essentially all of it dissolves in this aqueous solution, turning the solution from colorless to a very deep red. The solution is then boiled carefully to remove all the water. Once dry, it is heated to some 300–400° C., and melts to a deep red liquid, representing a melt of $Na_2S_5$. The 35 gms. of pure amorphous (one micron and less) ZnS is added. The ZnS dissolves in the molten sodium polysulfide. In this particular run the melt is heated 2 hours at 400° C., 15 hours at 500° C., and 2 hours at 800° C. At this point, all the sulfur has boiled off, and, since the temperature is below the melting points of both the $Na_2S$ and the ZnS (with no solubility in each other) the mass is solid, consisting of a physical mixture of ZnS crystals in a $Na_2S$ matrix.

The crucible with its contents is placed in distilled water, and the $Na_2S$ dissolves readily, liberating the crystalline ZnS, which is readily filtered off and washed with water. Some superficial oxidation of the ZnS occurs, and the ZnO that has formed is readily removed by washing the crystals with dilute acetic acid (which dissolves ZnO but not ZnS). If any polysulfide remains, the leach solution will show a yellow color. Otherwise it is water white.

The heating is carried out in air, whereby the escaping sulfur burns to $SO_2$ above the crucible; in $N_2$ or other inert gas whereby the sulfur is carried away and condenses in the cooler regions (and can be recovered for re-use); in $H_2$ atmosphere whereby the sulfur is removed as gaseous $H_2S$; or, indeed in other atmospheres such as HCl if this is beneficial in developing semi-conductor properties.

The ZnS crystals resulting from the treatment described above show a particle size range between 10 and 100 microns with the bulk of the crystals being between 15–25 microns, a size typical of commercial ZnS phosphors.

The ZnS resulting from the experiment above has been analyzed by X-ray diffraction and found to be of the order of 70% cubic form, 30% hexagonal form, and about 2–3% ZnO, which is readily removed by washing with HAc, as stated earlier.

*Example 2*

A series of four experiments were run in which the ZnS content was varied in relation to the $Na_2S_5$ content in the amounts of 7.5, 15, 22.5 and 30%, the firing conditions being the same as above. While little difference could be seen in the particle size of the resulting ZnS between the 7.5 and 15% additions, the runs with higher ZnS percentage have somewhat smaller particle sizes. From this it may be inferred that the solubility of ZnS in molten $Na_2S_5$ is of the order of 20%, the decreased particle size resulting from the presence of a large number of undissolved particles, acting as seed crystals.

*Example 3*

24 gms. $Na_2S \cdot 9H_2O$ is heated to about 100° C., and dissolved in its own water of crystallization. 12 gms. of sulfur is added, and practically all dissolves to give a very deep red solution. 3.50 gms. of fine, precipitated CdS is mixed in, and the slurry is heated to complete dryness. It is placed in a furnace (the container is alumina, covered with a larger crucible which fits completely over it) and heated in air to 580° C. (takes 2 hours to reach temperature). It is kept at this temperature for 20 hours—and then the power is turned off and furnace cooled.

The cool crucible is placed in a beaker of water and warmed. The remaining $Na_2S$ dissolves (there is no $Na_2S_x$ since the solution is colorless and if any $Na_2S_x$ were present the solution would be yellow), leaving CdS crystals. The crystals are washed a few times, then dried. Microscopic examination shows them to be 10–

50μ. They have clean faces as can be deduced from the light reflection from their surfaces.

Example 4

Identical experiments to Example 3 above were run with PbS, the only difference being that the time at 580° C. was 15 hours rather than 20 hours. PbS crystals were formed (from amorphous PbS) but the size of the crystals on microscopic examination show them to be about 5–10μ.

I claim:

1. A process for preparing useful crystals selected from the class consisting of zinc, cadmium and lead sulfides, selenides and tellurides which comprises (1) dissolving at least one said compound which is in a non-crystalline form in a molten solvent selected from the class consisting of alkali metal polysulfides, alkali metal polyselenides, alkali metal polytellurides, and mixtures of these, (2) heating the resultant solution to drive off volatiles selected from the group consisting of elemental sulfur, selenium, tellurium and mixtures of these, whereby said alkali metal polysulfides, polytellurides and polyselenides are converted to the corresponding alkali metal sulfides, tellurides and selenides and (3) leaching the resulting mixture with water to remove the water soluble materials essentially of the group consisting of alkali metal sulfides, selenides, tellurides and mixtures of these, leaving a residue of said useful crystals.

2. A process according to claim 1, in which the solvent is sodium polysulfide.

3. A process according to claim 1, in which the solvent is potassium polysulfide.

4. A process according to claim 2, in which heating is continued and sulfur driven off until substantially all the sodium polysulfide is converted into sodium sulfide.

5. A process according to claim 1, in which the starting material is selected from the group consisting of non-crystalline form of zinc selenide, lead selenide and cadmium selenide.

6. A process according to claim 5, in which the solvent is sodium polyselenide.

7. A process according to claim 5, in which the solvent is potassium polyselenide.

8. A process according to claim 5, in which the solvent is sodium polysulfide.

9. A process according to claim 1, in which the starting material is selected from the group consisting of non-crystalline forms of cadmium telluride, zinc telluride and lead telluride.

10. A process according to claim 9, in which the solvent is sodium polytelluride.

11. A process according to claim 9, in which the solvent is potassium polytelluride.

12. A process according to claim 9, in which the solvent is sodium polysulfide.

13. A process according to claim 1, in which the material being converted into useful crystalline form is zinc sulfide and the solvent is sodium polysulfide.

References Cited by the Examiner
UNITED STATES PATENTS
2,957,827   10/60   Nielsen _____ 23—51 X

OTHER REFERENCES

Hannay: Semiconductors, Reinhold Publishing Corporation, New York, February 1959, pages 125 to 130, 136 to 138 and 142–144.

MAURICE A. BRINDISI, *Primary Examiner.*